No. 712,814. Patented Nov. 4, 1902.
S. LAKE.
BATTERY INSTALLATION FOR SUBMARINE BOATS.
(Application filed Mar. 4, 1902.)
(No Model.) 2 Sheets—Sheet 1.
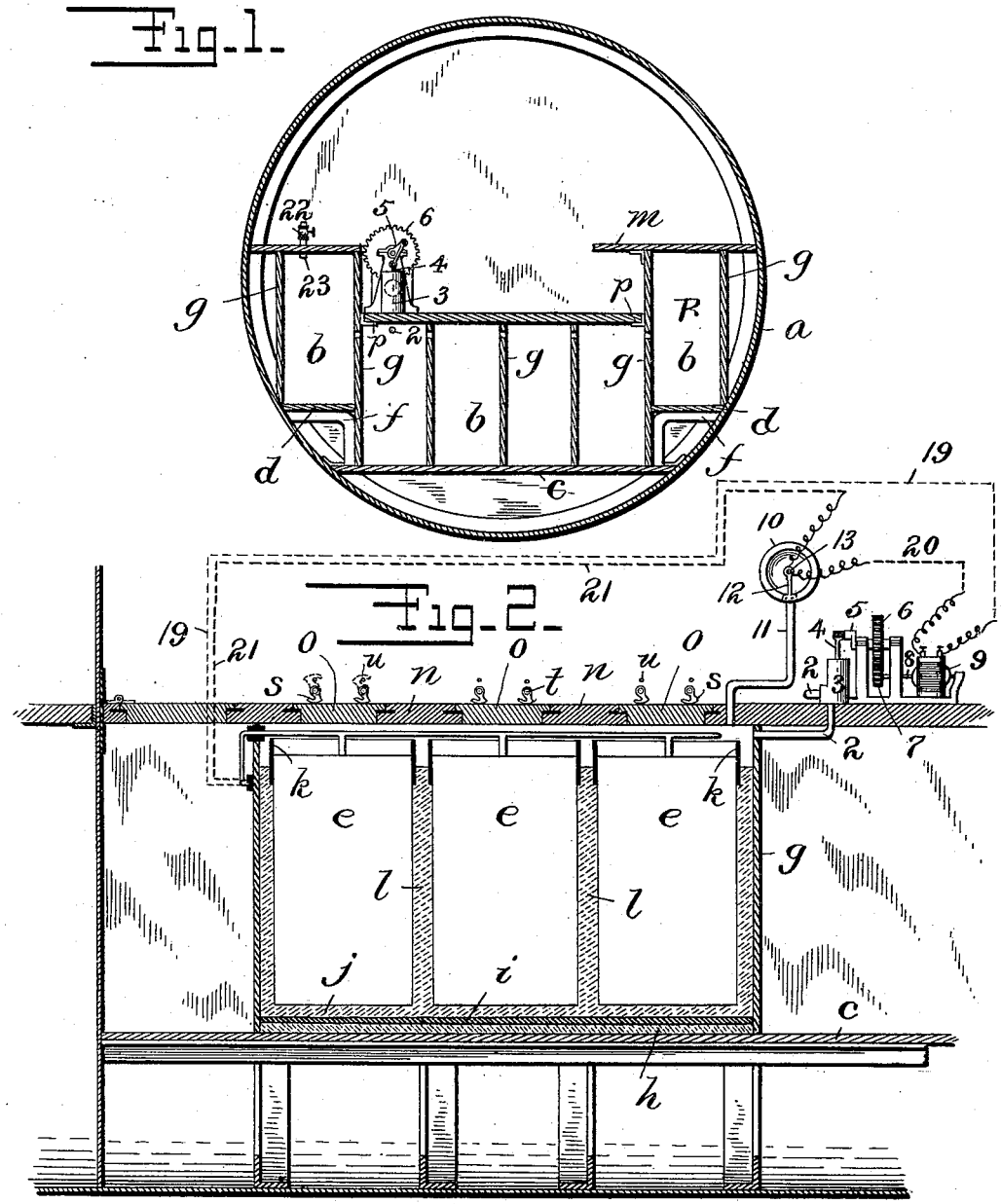
WITNESSES:
INVENTOR No. 712,814. Patented Nov. 4, 1902.
S. LAKE.
BATTERY INSTALLATION FOR SUBMARINE BOATS.
(Application filed Mar. 4, 1902.)
(No Model.) 2 Sheets—Sheet 2.
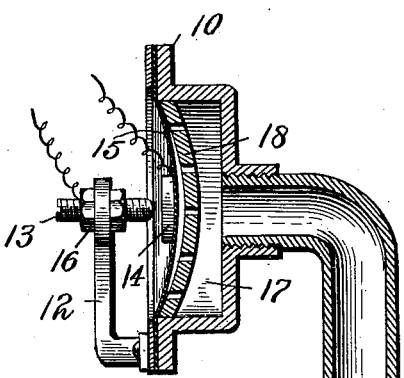
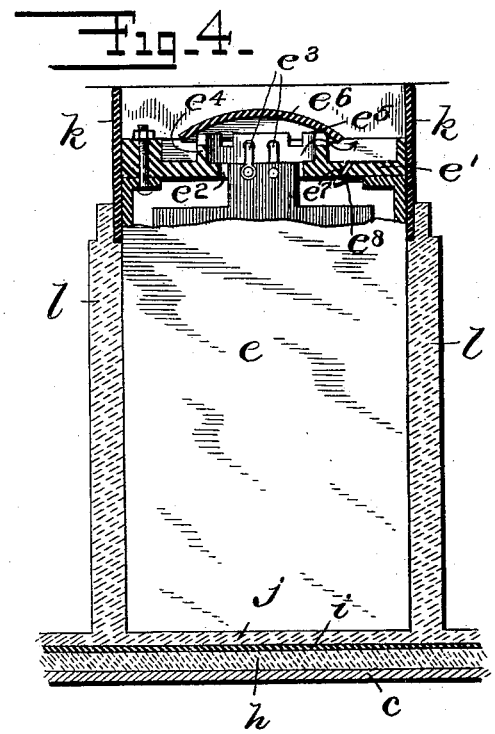
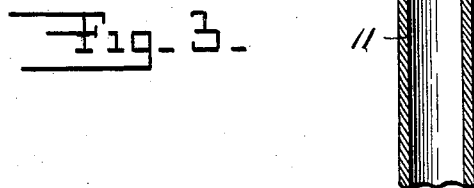
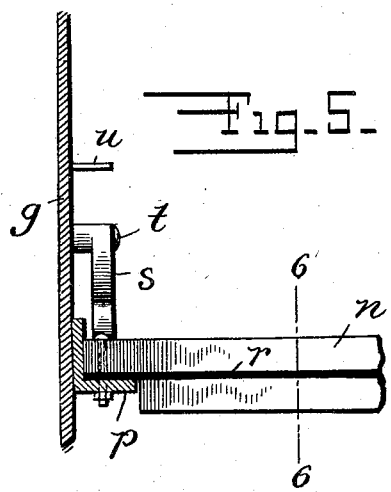
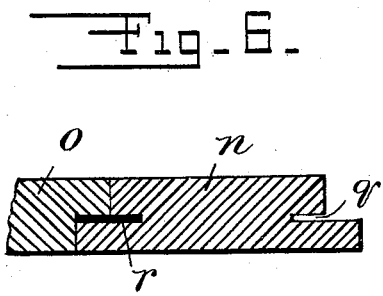
WITNESSES:
J. B. McGirr.
Henry A. Kornemann.
INVENTOR
Simon Lake,
By Henry J. Miller,
Atty.

UNITED STATES PATENT OFFICE.

SIMON LAKE, OF BRIDGEPORT, CONNECTICUT.

BATTERY INSTALLATION FOR SUBMARINE BOATS.

SPECIFICATION forming part of Letters Patent No. 712,814, dated November 4, 1902.

Application filed March 4, 1902. Serial No. 96,633. (No model.)

*To all whom it may concern:*

Be it known that I, SIMON LAKE, a citizen of the United States, residing at Bridgeport, in the county of Fairfield and State of Connecticut, have invented certain new and useful Improvements in Battery Installations for Submarine Boats, of which the following is a specification.

This invention has for its object to provide a storage-battery-installation system for submarine boats which shall be compact, shall insure a thorough insulation between the several battery-cells and their permanent relative disposition within the hull, and shall effectually prevent the escape of the battery fumes and gases into the adjacent portions of the boat.

To this end the present improvement consists partly in a special construction of air and gas tight compartment for inclosing the system of storage-battery cells, partly in a composite waterproof insulating-lining for said compartment and in a waterproof and non-conducting cement filling intermediate the several battery-cells and the side walls, and partly in certain other matters which will be hereinafter described and claimed.

In the annexed drawings, Figure 1 is a transverse sectional elevation of a submarine boat provided with my present improvements, and Fig. 2 is a longitudinal vertical section of the same. Fig. 3 is a sectional elevation of the circuit-closing device for controlling the pump-actuating motor. Fig. 4 is a partial sectional view showing one of the battery-cells, with the surrounding insulation. Figs. 5 and 6 are sectional views illustrating the details of construction of the battery-compartment.

The metallic hull $a$ is shown of circular cross-section, with its lower midship portion partitioned off into a battery chamber or compartment $b$, having the substantially flat bottom $c$, with elevated offset portions extending along the opposite sides longitudinally of the boat to form battery-shelves $d$, which latter may be of creosoted wooden planks, providing suitable insulation between the battery-cells $e$, resting thereon, and the metallic supporting-brackets $f$. The bottom of said compartment is indicated as of sheet metal and the side walls and partitions $g$ of creosoted wood; but the bottom and sides may be of the same material, if desired, wood being preferable, excepting where great strength and stiffness are required, as for the floor of the compartment, by reason of its insulating qualities. The metallic floor of the compartment is shown covered with a thin layer of cement $h$ impervious to moisture, as asphaltum, to which is added a layer $i$ of some flexible waterproof insulating material, as sheets of linoleum, a second layer $j$ of waterproof cement being superposed to complete the composite waterproof insulating-lining, upon which is placed the series of battery-cells $e$, suitably spaced and having their elements electrically connected together in the usual manner. A band $k$ of waterproof insulating material, as sheet-rubber, is shown wrapped around the upper portion of each of the battery-cells, with its upper edge projecting above the latter, and the intervening spaces between the cells and the side walls of the compartment are filled with waterproof cement $l$, which serves not only to insulate the cells each from the others and to exclude moisture intermediate the same, but to maintain them in fixed relation under any motion of the boat, so as to prevent their possible disarrangement. This filling of cement around the individual cells of the series and between said cells and the walls of the compartment occupies the greater part of the space of the chamber or compartment which would otherwise be occupied by air and gases generated in the charging of the batteries, so as to permit only a minimum space for the accumulation of such air and gases and for their removal by means of the ventilating devices, and, further, serves to form a system of gutters or conduits elevated materially above the bottoms of the cells of which the sides of the cells form sealed side walls for the effective drainage of the compartment and prevents the penetration of moisture beneath the cells, where the latter would be detained and cause the impairment of the efficiency of the apparatus, as in former constructions. The textile intermediate layer of the composite lining adjacent the metallic wall of the compartment obviously serves by its flexibility and elasticity to bind the lining together in case a crack should occur in the harder members of the coating by reason of the expansion and contraction of the adjacent metal, and thereby prevents the penetration of the battery fluid through such crack or seam in case of overflow, which it is the object of the non-conducting waterproof band $k$ to obviate, as well as to prevent the short-circuiting of adjacent batteries by the spilled fluid in case of such accident.

The form of battery construction which I prefer in order to retain the fine spray of battery fluid carried upward by the gases set free in charging is illustrated in Fig. 4, in which the cell $e$ is shown provided with a cap $e'$, having a recess in its upper side and a central aperture $e^2$ for the connections $e^3$, surrounded by an annular flange or curb $e^4$, having the projecting portions $e^5$, sustaining an inverted impervious cup $e^6$, serving to intercept and return such small particles of battery fluid which gravitate therefrom into the recess of the cap $e'$ and descend from the latter through holes or ducts $e^7$, closed by the rubber flap valves or shields $e^8$, back into the cell $e$.

In submarine boats, wherein it is of the greatest importance that the space be economized to the fullest extent, a disadvantage in this regard has been experienced in the employment of the circular cross-sectional form of the hull, which offers a comparatively small floor-space for a given diameter. To obviate this difficulty, I have arranged the shelves $d$ on the opposite sides of the battery-compartment, thereby permitting the disposition of the general floor-level near the bottom, so as to allow ample head-room in the middle of the boat, while utilizing the sides for battery-space, over which there is still room for the seats or bunks $m$ for the crew, as indicated.

The side walls of the compartment are or may be constructed by any well-known method whereby the joints are sealed air and gas tight; but I have devised a particular construction whereby the flooring constituting the cover of the battery-compartment may be laid with air and gas tight joints and partially or wholly removable for access to the batteries beneath. This flooring is shown constructed of two alternating series of fixed and removable floor-planks $n$ and $o$, respectively, whose ends are secured upon the angle-pieces $p$, extending longitudinally of the hull. The fixed planks $n$ are each rabbeted along the longitudinal upper edges and provided at the inner angle of the rabbet with a saw-kerf $q$, into which is laid a hollow rectangular sheet $r$ of rubber or other suitable yielding packing overlying the lateral surface of the rabbet and the under side of the notched end portions which rest upon and are bolted to the lateral flanges of the angle-pieces $p$. The removable planks $o$ are similarly rabbeted along the lower edges and ends and are fitted to the rabbeted edges of the planks $n$ and angle-pieces $p$, upon which latter are placed intermediate the ends of the planks $n$ yielding packings, upon which and the packings $r$ the planks $o$ are removably clamped by means of the cam-dogs $s$, pivoted at $t$. By loosening the cam-dogs $s$ and throwing them over upon the stop-pins $u$, as indicated in dotted lines in Fig. 2, the planks $o$ are unlocked and may be withdrawn for inspection of the batteries disposed thereunder.

The battery-compartment is shown connected with the exterior of the boat by means of the vent or discharge pipe 2, connected with the air-pump 3, whose piston-rod 4 is attached to the crank 5, carried by a gear-wheel 6, meshing with a pinion 7, mounted upon the shaft 8 of an electric motor 9. The motor 9 is controlled by means of the diaphragm-pressure regulator 10, connected by means of the pipe 11 with the battery-compartment and preferably independently of the vent or discharge pipe 2. This pressure-regulator is provided with a bracket-arm 12, carrying a screw-stud 13, constituting the stationary member of a circuit-closer, of which the movable member is formed by a contact-piece 14, secured to the thin sensitive rubber diaphragm 15, and thus adapted to move to and from the contact-stud 13 as the atmospheric pressure varies in the battery-compartment. The operative end of the contact-stud 13 may be adjusted for contact with the contact-piece 14, corresponding with any given pressure or partial vacuum in the battery-compartment, by merely turning such stud in the proper direction and setting it in its adjustment by means of lock-nuts 16. The regulator-chamber 17 is provided with a perforated shield or partition 18 to prevent the injury of the diaphragm under an excessive vacuum in the battery-compartment. The electric motor 9 has one of its terminals connected directly with its source of electric current (as the battery system shown herein) by means of the conducting-wire 19, while its other terminal is similarly connected by the conducting-wire 20 to one of the members of the circuit-closer 13 14, of which the other member is connected by the wire 21 with the opposite pole of the battery system or other source of current.

It is obvious that the motor 9 will be actuated to operate the air-pump 3 only when the atmospheric pressure in the battery-compartment is such as to cause the circuit-closer to close the motor-circuit for supplying electric power to the motor, the latter remaining at other times inactive, such regulated intermittent operation of the pump causing the pressure in the battery-compartment to remain normal under any given adjustment of the contact-stud 13 corresponding to the desired pressure.

While the battery-compartment is designed to be closed from the adjacent portions of the boat during the battery-charging operation, it is obvious that by opening the valve 22 in the pipe 23, leading into the adjacent compartment, a constant circulation through said compartment may be maintained at an automatically-regulated flow, and the invention is not, therefore, to be understood as limited to a battery-compartment having no means of normal communication with other parts of the boat.

Although the several parts of the present improvement are herein shown and described somewhat specifically, it is evident that they may be widely varied in construction and arrangement without departure from the spirit of the invention.

I make no claim herein to the means set forth and described in the foregoing specification for maintaining a uniform atmospheric pressure in the battery-compartment, as the same forms the subject of a divisional application filed by me June 23, 1902, Serial No. 112,823.

Having thus set forth the nature of the invention, what I claim herein, and desire to secure by Letters Patent, is—

1. The combination with the metallic hull of a submarine boat, of a system of storage batteries of which each individual cell is set in and has its lower portion surrounded by a bed of cement impervious to moisture and thereby insulated each from the other and from said hull.

2. The combination with the metallic hull of a submarine boat, of a system of storage batteries set in a bed of hard cement impervious to moisture and having embedded therein adjacent to the wall of said hull a sheet or layer of flexible waterproof material.

3. The combination with the metallic hull of a submarine boat, of a system of storage batteries set in a bed of cement impervious to moisture, and a band of waterproof insulating material surrounding and projecting above the top of each battery-cell and also embedded in said cement.

4. The combination with the hull of a submarine boat provided with a battery-compartment, of a lining for said compartment formed of two layers of waterproof cement with an interposed sheet or layer of flexible waterproof material.

5. The combination with the hull of a submarine boat provided with a battery-compartment, of a lining for said compartment formed of two layers of asphaltum cement with an interposed layer of linoleum.

6. The combination with the hull of a submarine boat provided with a battery-compartment, of a lining for said compartment consisting of two layers of waterproof cement with an interposed sheet or layer of flexible waterproof material, a series of spaced battery-cells set upon the bottom of said battery-compartment, and a filling of cement in the spaces intermediate each battery-cell and the adjacent cells and the side walls of said compartment.

7. The combination with the hull of a submarine boat provided with a battery-compartment having air and gas tight bottom and side walls, and a system of storage batteries inclosed within said compartment, of a sealed covering for said compartment consisting of a series of floor-planks comprising removable members secured upon yielding packings around the edges of the same.

8. The combination with the hull of a submarine boat provided with a battery-compartment having air and gas tight bottom and side walls, and a system of storage batteries inclosed within said compartment, of a sealed covering for said compartment comprising a series of spaced floor-planks secured upon a yielding packing and provided each along its edges with a rabbet also containing a yielding packing, and a series of alternately-disposed floor-planks fitted to said rabbeted edges of the first-named series and having their ends seated upon the superposed yielding packing of an intermediate support, and means for detachably securing said last-named floor-planks in position.

9. A submarine boat having a hull of circular cross-section constructed with a sealed battery-compartment having a substantially flat floor and provided along the opposite sides with offsets constituting shelves extending longitudinally of the boat, and a system of storage batteries supported upon said floor and shelves.

In testimony whereof I have signed my name to this specification, in the presence of two subscribing witnesses, this 26th day of February, 1902.

SIMON LAKE.

Witnesses:
L. B. MILLER,
HENRY J. MILLER.